United States Patent [19]

Kutik et al.

[11] 4,272,228
[45] Jun. 9, 1981

[54] HIGH VOLUME DISPENSING PUMP

[75] Inventors: Louis F. Kutik, Fort Lauderdale; Howard E. Cecil, Miramar, both of Fla.

[73] Assignee: Security Plastics, Inc., Miami Lakes, Fla.

[21] Appl. No.: 59,982

[22] Filed: Jul. 23, 1979

Related U.S. Application Data

[63] Continuation-in-part of Ser. No. 28,962, Apr. 11, 1979, abandoned.

[51] Int. Cl.³ .............. F04B 21/04; B67D 5/42; F04B 19/00
[52] U.S. Cl. ..................... 417/460; 417/556; 222/383; 222/556
[58] Field of Search .............. 417/469, 550, 552, 553, 417/554, 555, 551; 222/320, 321, 383, 556, 381

[56] References Cited

U.S. PATENT DOCUMENTS

| 2,984,190 | 5/1961 | Dibley et al. | 417/550 |
| 3,270,689 | 9/1966 | Hettinga | 417/547 |
| 3,352,463 | 11/1967 | Berler | 222/321 |
| 3,474,939 | 10/1969 | O'Donnell et al. | 222/320 |
| 3,507,586 | 4/1970 | Gronemeyer et al. | 417/480 |
| 3,527,551 | 9/1970 | Kutik et al. | 417/560 |
| 3,907,174 | 9/1970 | Steiman | 222/321 |
| 4,071,172 | 1/1978 | Balogh | 222/321 |

*Primary Examiner*—William L. Freeh
*Attorney, Agent, or Firm*—Oltman and Flynn

[57] ABSTRACT

A high volume, low profile, quick acting, dispensing pump features valve members provided with flow restricting passages which accelerate the opening and closing action of the valve members and thus make it possible for the pump to handle large volume quickly. The low profile is achieved by wrapping the pressurized compartment around the intake of the pump.

10 Claims, 18 Drawing Figures

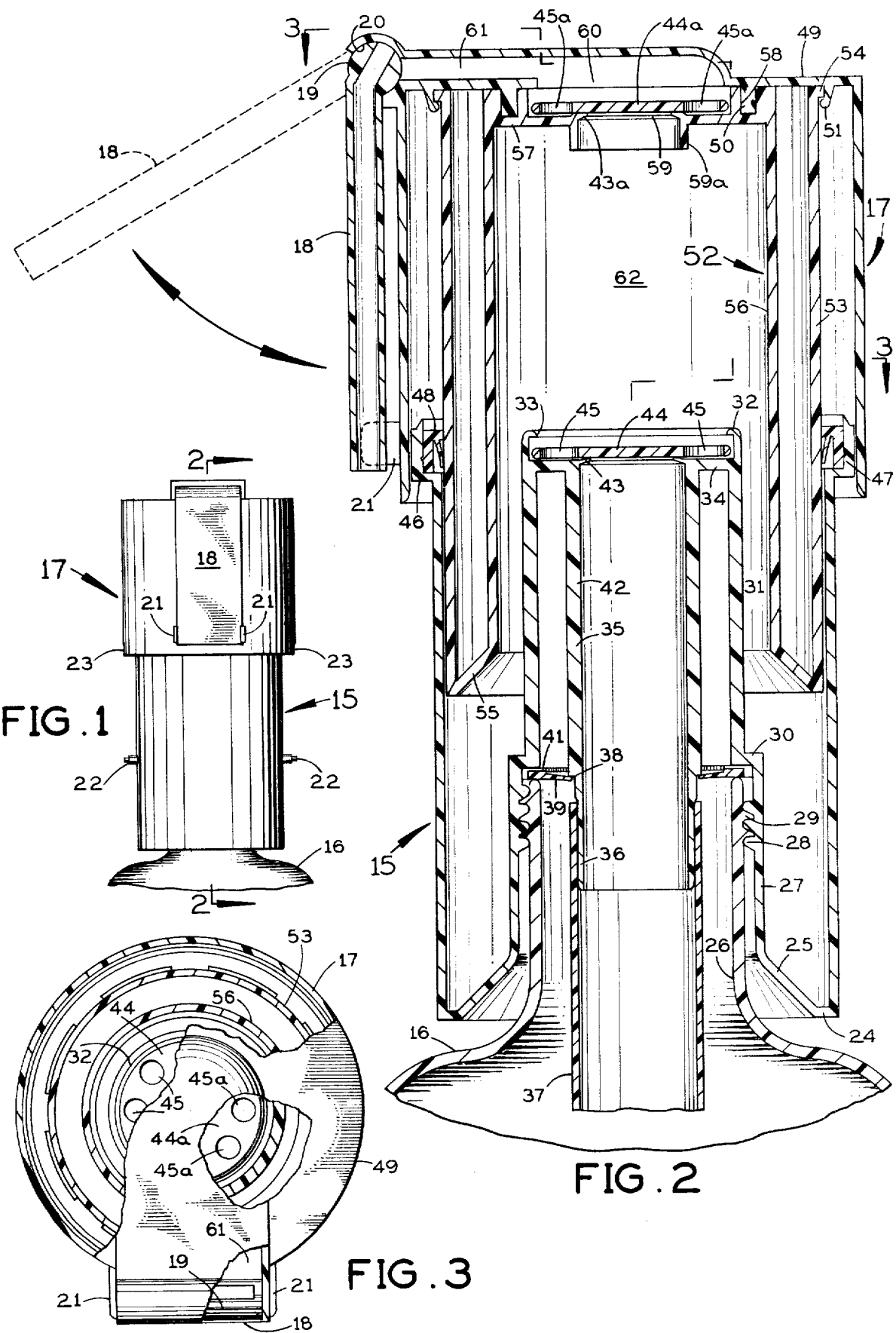

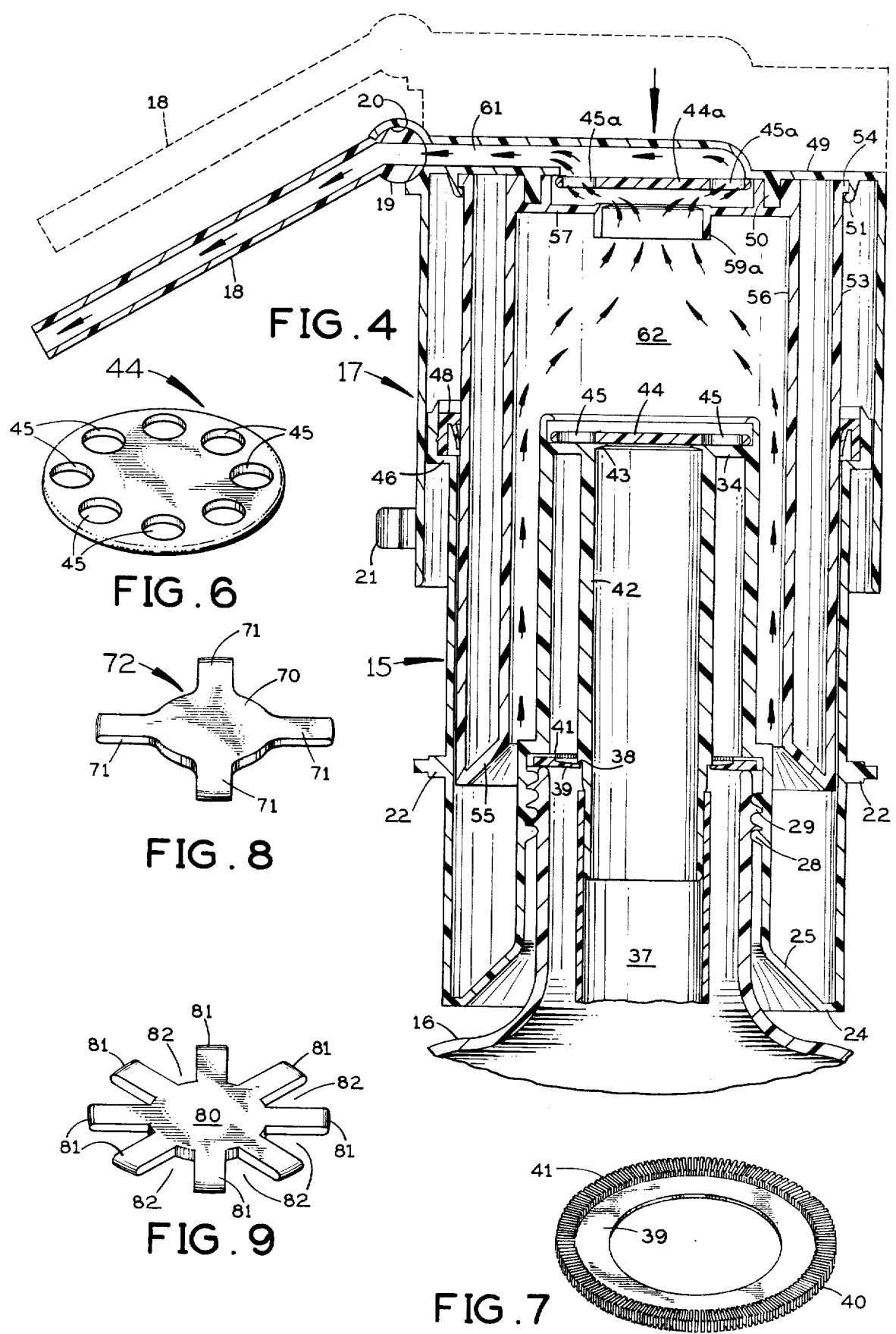

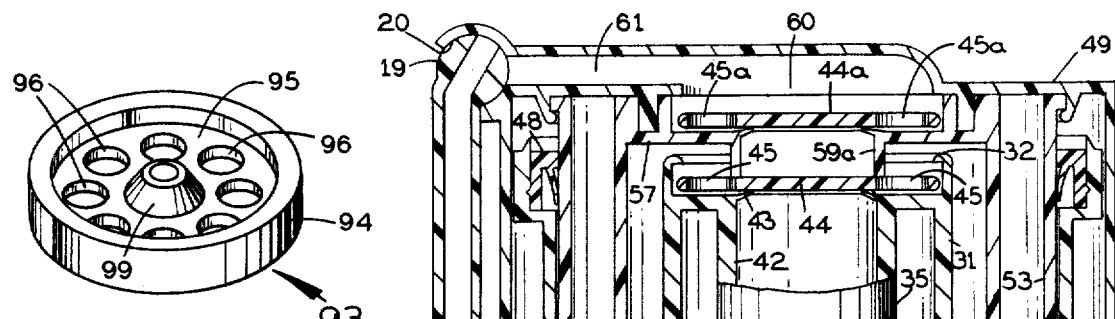
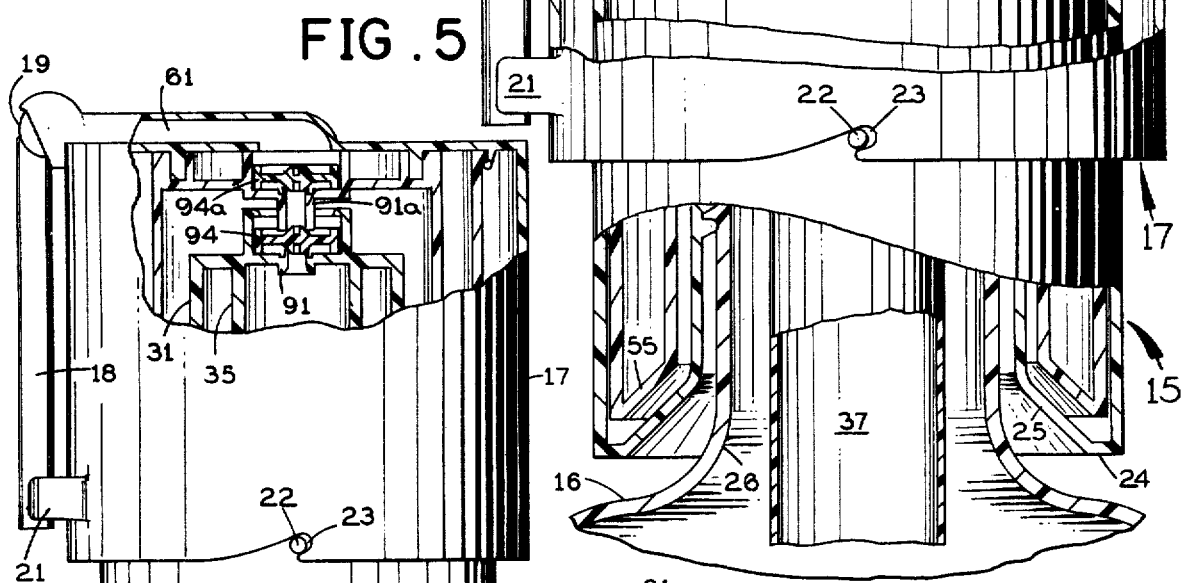
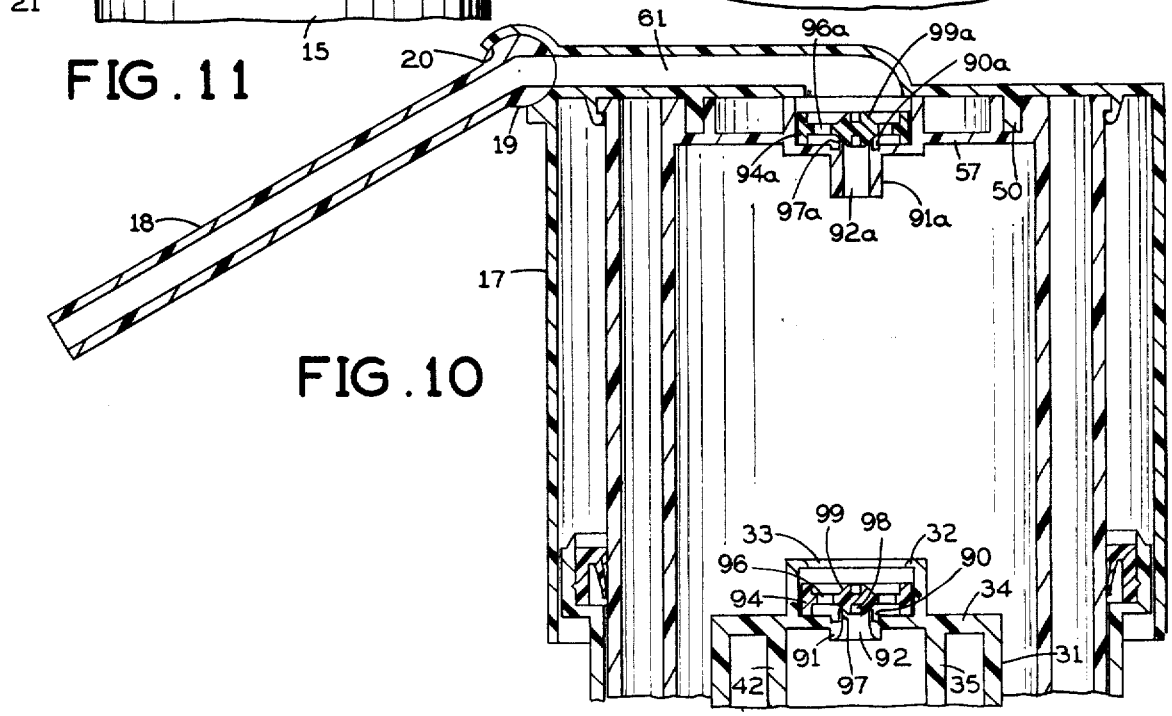

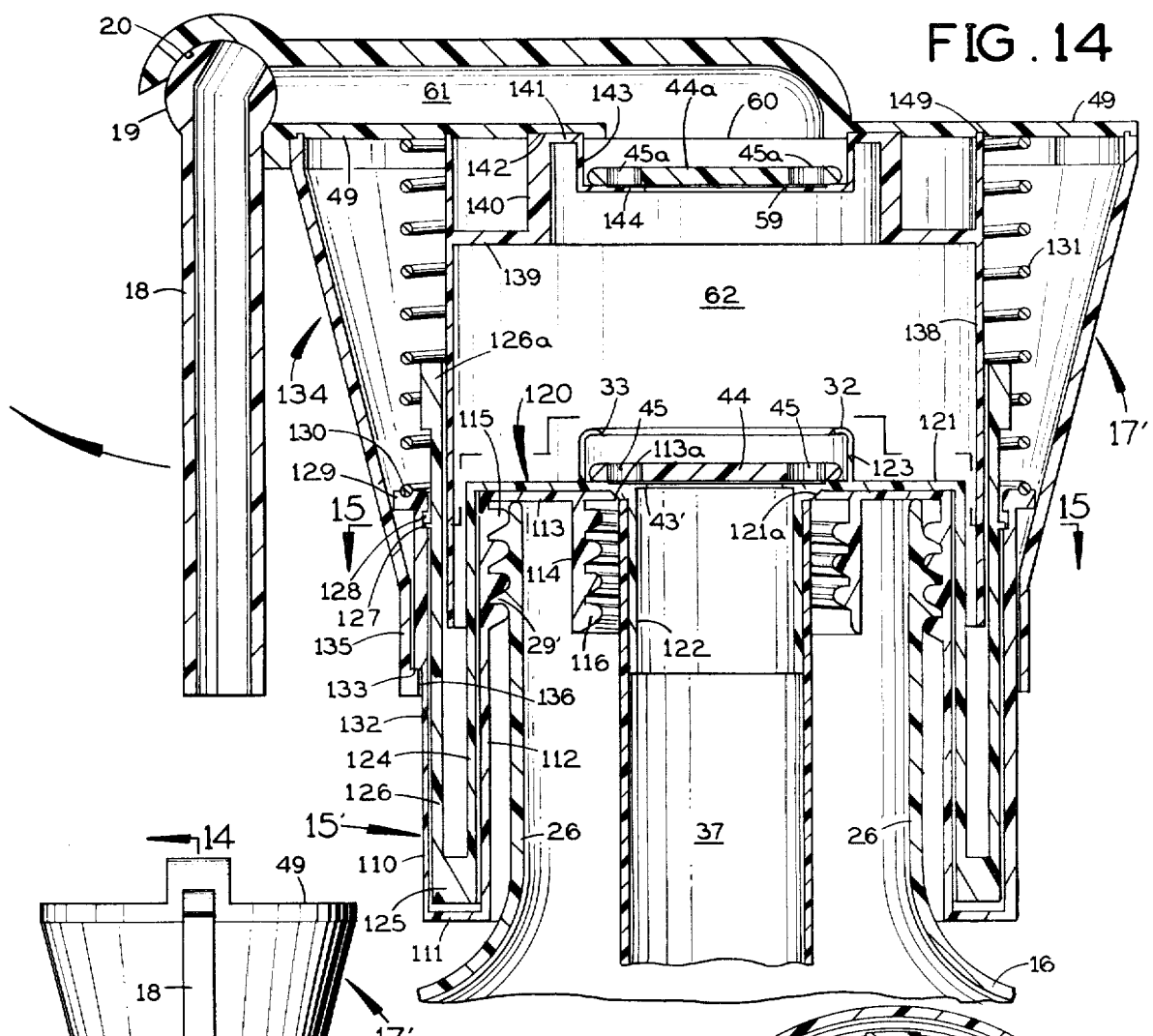
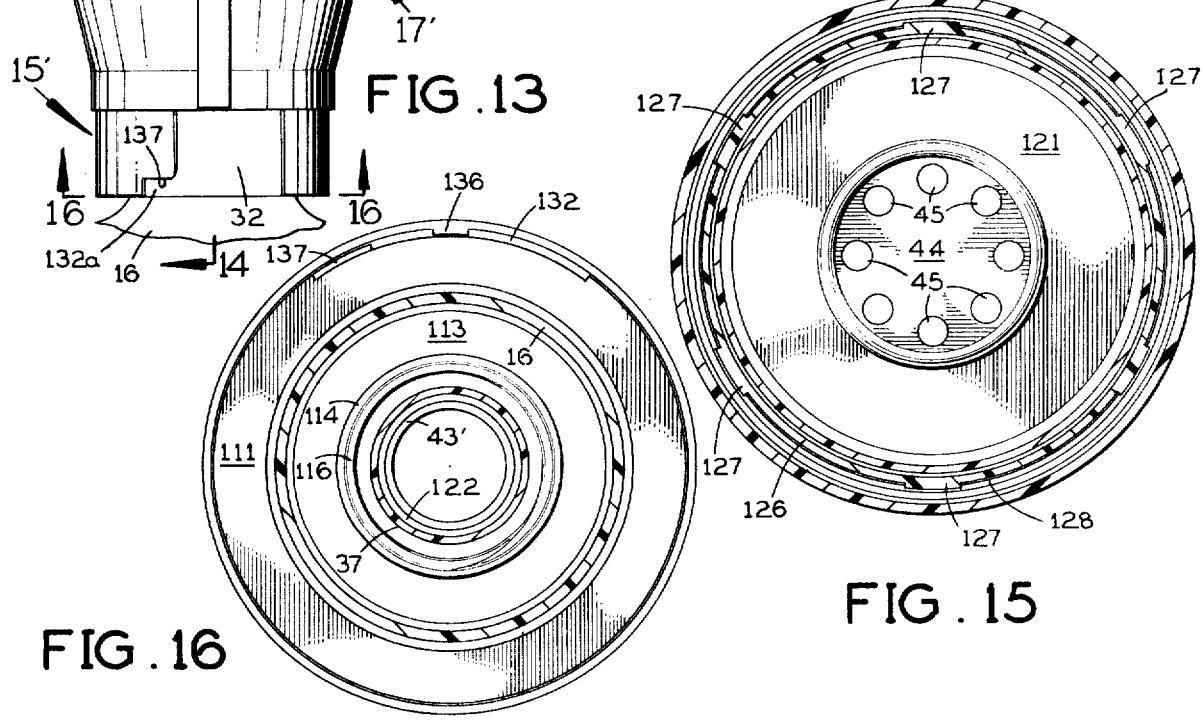

HIGH VOLUME DISPENSING PUMP

CROSS REFERENCE TO RELATED APPLICATION

This application is a continuation-in-part of our co-pending U.S. patent application Ser. No. 28,962, filed Apr. 11, 1979, now abandoned, and assigned to the same assignee as the present application.

BACKGROUND OF THE INVENTION

For some applications, such as dispensing liquid soap from a container, there has been a need for a low cost, high volume, quick acting dispensing pump. A pump of this general type is described and claimed in U.S. Pat. Nos. 3,507,586 and 3,527,551 of L. F. Kutik and E. W. Gronemeyer and also in U.S. patent application Ser. No. 957,056 filed on Nov. 2, 1978 by L. K. Kutik and H. E. Cecil. The pump features a non-throttling peripheral exhaust valve capable of delivering large volumes of liquid quickly. It has been found, however, that after the actuator of the pump has been depressed, it takes too long for the actuator to return upward to its rest position, and this is related to the limited volume handling capabilities of the intake valve.

SUMMARY OF THE INVENTION

The present invention involves the provision of one or more flow restricting passages with centering portions in a valve member of a pump for accelerating and completing the opening and closing of the valve disc member to make it possible to provide a high volume, quick acting pump. The pump also has a low profile despite its large capacity, and the low profile is facilitated by wrapping the pressurizing compartment around the intake of the pump and even extending substantially below the intake valve. Other features will be apparent from the description herein.

Accordingly, it is an object of the invention to accelerate the valve action in a large volume pump so as to make the pump quick acting in both intake and discharge phases of its operation.

Another object of the invention is to lower the profile of a high volume pump to make the pump short and compact despite its high capacity.

Other objects of this invention will appear from the following description and appended claims, reference being had to the accompanying drawings forming a part of this specification wherein like reference characters designate corresponding parts in the several views.

DESCRIPTION OF THE DRAWINGS

FIG. 1 is a front elevational view of a first embodiment of the present pump on the mouth of the container;

FIG. 2 is a vertical cross-section taken centrally through this pump along the line 2—2 in FIG. 1 and showing both the inlet and discharge valves closed;

FIG. 3 is a view taken along the line 3—3 in FIG. 2;

FIG. 4 is a view similar to FIG. 2 showing the pump operated to dispense fluid product;

FIG. 5 is a view of the pump partly in elevation and partly in vertical section, showing the position of the parts when the pump is locked in an inoperative position;

FIG. 6 is a perspective view of one embodiment of the valve disc in the inlet valve and in the discharge valve of the present pump;

FIG. 7 is a perspective view of the air vent ring in the pump for letting air into the top of the container;

FIG. 8 is a perspective view of a second embodiment of the valve disc in either or both the inlet and discharge valves.

FIG. 9 is a similar view of a third embodiment of the valve disc;

FIG. 10 is a view similar to FIG. 2 and showing a further modification of the inlet valve and the discharge valve in the present pump, with both valves closed;

FIG. 11 is a view similar to FIG. 5 and showing the position of the parts of the FIG. 10 pump when the pump is locked in an inoperative position;

FIG. 12 is a perspective view of the valve disc in the inlet valve and in the discharge valve in FIG. 10;

FIG. 13 is a front elevational view of another embodiment of the present pump with the plunger up;

FIG. 14 is a longitudinal vertical section taken along the line 14—14 in FIG. 13;

FIG. 15 is a horizontal cross-section taken along the line 15—15 in FIG. 14;

FIG. 16 is a horizontal cross-section taken along the line 16—16 in FIG. 13;

Figure 17:
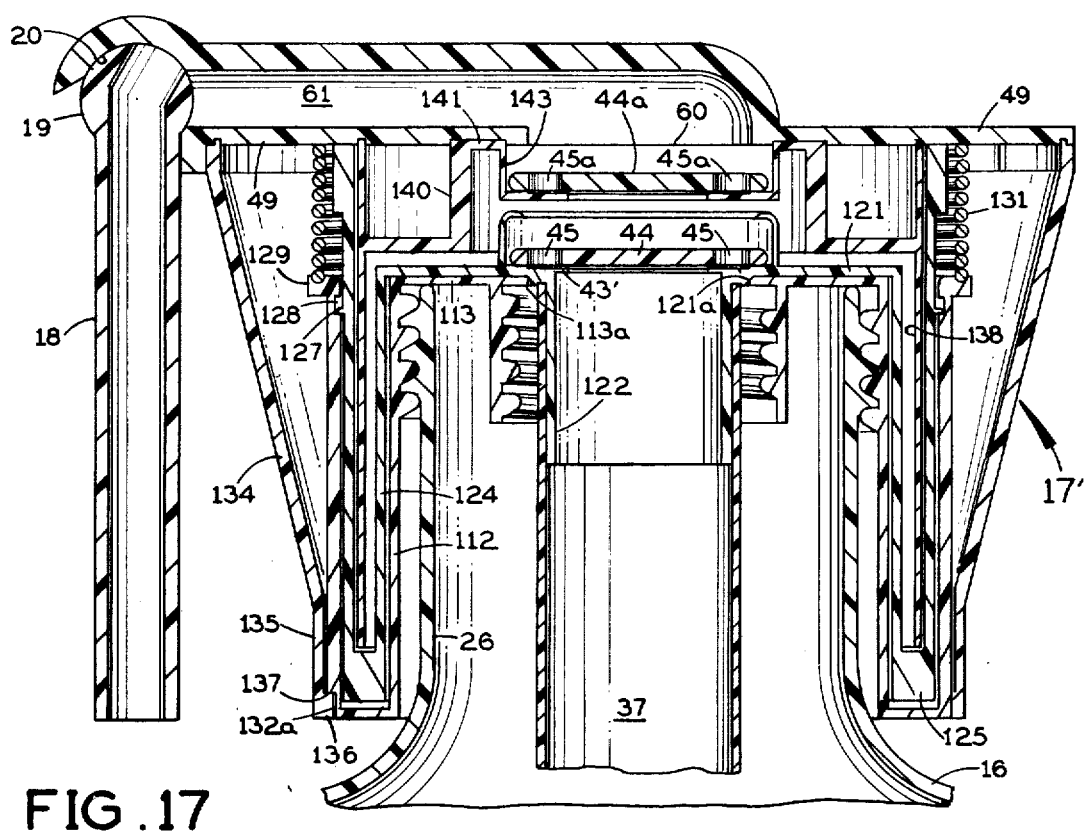
FIG. 17 is a view similar to FIG. 14, showing the plunger locked in the down position.

Before explaining the disclosed embodiments of the invention in detail, it is to be understood that the invention is not limited in its application to the details of the particular arrangements shown since the invention is capable of other embodiments. Also, the terminology used herein is for the purpose description and not of limitation.

DETAILED DESCRIPTION FIGS. 1-7

Referring to FIG. 1, this embodiment of the present pump has a fixed body 15 attached to the mouth of a container 16 holding a fluid product, such as a liquid soap or detergent, skin cream, shaving cream, or a powder. A manually operated plunger 17 is slidable up and down along the fixed body 15 for pumping the fluid product out of the container 16. The plunger carries a pivoted discharge spout 18 with an enlargement 19 (FIG. 2) at its upper end (FIG. 2) which is slidably received in a complementary recess 20 formed in the top of plunger 17 at one side. At this side the plunger 17 presents a pair of flexible and resilient ears 21 for releasably holding the lower end of the discharge nozzle 18 between them.

The fixed body 15 of the pump has a pair of outwardly projecting stubs 22 on its opposite sides which are engageable by bayonet slots 23 (FIG. 5) on the lower end of the plunger 17 when the latter is pushed down along the fixed body 15 and then rotated slightly. This locks the pump in an inoperative position as shown in FIG. 5.

Referring to FIG. 2, the cylindrical outer side wall of the fixed body 15 of the pump is joined at its lower end to an annular, radially inwardly projecting segment 24 from which a conical segment 25 projects upwardly and inwardly around the neck 26 at the top of the container 16. A cylindrical, intermediate lower side wall 27 extends up from the conical segment 25 and presents an internal screw thread 28 which threadedly engages an external screw thread 29 on the outside of the container neck 26 just below the mouth at its upper end. The fit between the screw threads 28 and 29 is loose enough to permit air to leak past them freely but tight enough to mount the fixed body 15 of the pump securely on the container neck 26 without leakage of liquid product A short distance above its internal screw thread 28 the cylindrical, intermediate, lower side wall 27 of the fixed body 15 of the pump terminates in a radially inwardly projecting, annular, transverse shoulder 30 which overlies the mouth of the container and is spaced slightly above it. A cylindrical, intermediate, upper side wall 31 extends up from the transverse shoulder 30. The intermediate upper side wall 31 terminates at its upper end in a radially inturned lip 32 encircling an opening 33.

A short distance below this lip an annular, transverse top wall 34 extends radially inward from the intermediate upper side wall 31. At the inner end of this top wall 34 a cylindrical inner side wall 35 extends down concentrically inside the intermediate upper side wall 31 and the intermediate lower side wall 27. The inner side wall 35 has a slightly reduced lower end segment 36 which has a tight fit inside the upper end of a dip tube 37, which extends down into the container for passing fluid product from the container. The innerside wall 35 defines a cylindrical passageway 42 which is a longitudinal continuation of the passageway through the dip tube 37.

On the outside the inner side wall 35 presents a downwardly-facing, transverse, annular shoulder 38 at a level just slightly below that of the transverse shoulder 30 which joins the lower and upper intermediate side walls 27 and 31 of the fixed body 15 of the pump.

In accordance with this embodiment of the present invention, a vent ring as shown in FIG. 7 is engaged between the top of the container neck 26 and the fixed body 15 of the pump at the shoulders 30 and 38. This ring has a thin, flat, easily flexible and resilient annular lip 39 at the inside which normally seats against the downwardly-facing shoulder 38 on the inner side wall 35 of the fixed body 15. Encircling this lip and formed integral with it is a thicker peripheral segment 40 of the ring which has a multiplicity of radial grooves 41 in the top. As product is withdrawn from the container, air can leak past the screw threads 28 and 29 and through the grooves 41 and down past the readily flexible lip 39 at the inside of the ring, so that the inside of the container above the fluid level will be substantially at atmospheric pressure. The vent ring thus acts as a check valve to prevent the creation of a significant partial vacuum in the container 16 above the level of the fluid as a consequence of the pumping of fluid out of the container.

At the upper end of the passageway 42 formed by the cylindrical inner side wall 35 an annular flexible flange 43 extends laterally inward and slightly upward from the top wall 34. This flange provides the valve seat of an inlet valve of the pump. This inlet valve has a movable valve member 44, as shown in FIG. 6, in the form of a relatively thin, flat, circular disc having a plurality of circumferentially spaced circular openings 45. As shown in FIG. 2, the valve disc 44 is confined between the flange 43 and the top wall 34 below and the upper lip 32 above. The imperforate central part of the valve disc 44 overlies and normally sealingly engages the inner edge of the flange 43, which is soft and slightly flexible to improve the substantially fluid-tight seal between them. In this position the imperforate central part of the valve disc 44 blocks the openings 45 from fluid communication with the passageway 42.

The outer side wall of the fixed body 15 of the pump at its upper end is joined to a radially outwardly extending, annular, transverse shoulder 46. A short cylindrical collar 47 of slightly larger diameter than the outer side wall extends up from the shoulder 46 and has a snug, sliding fit inside the cylindrical outer side wall of the plunger 17. The shoulder 46 and collar 47 define an annular pocket for locating a flexible and resilient sealing ring 48.

The plunger 17 of the pump has a top wall 49 with a downwardly projecting, annular, rigid, inner rib 50 and a downwardly projecting, annular, flexible and resilient lip 51 located radially outwardly from the rib 50 and concentric with it. The plunger has a separately formed inner body member which has a snap fit attachment of its upper end to the top of the plunger between the depending inner rib 50 and lip 51 on the latter. The inner body member 52 has a cylindrical outer side wall 53 with a slightly enlarged upper end segment 54 which is retained up against the top wall 49 of the plunger 17 by a rounded bead on the lower end of the lip 51.

The sealing ring 48 carried by the fixed body 15 of the pump sealingly engages the outside surface of the outer side wall 53 of the inner body member 52 on the plunger.

The lower end of the outer side wall 53 is joined to an inwardly and upwardly inclined, conical bottom wall 55. A cylindrical inner side wall 56 extends up from the conical bottom wall 55 concentric with the outer side wall 53. A transverse top wall 57 is joined to the inner side wall 56 and presents an upwardly-facing annular groove 58 which snugly receives the downwardly extending rib 50 on the top wall 49 of the plunger.

The top wall 57 of the inner body member on the plunger has a central opening 59 encircled by an annular flexible lip 43a which is identical to the previously mentioned lip 43 that serves as the valve seat of the inlet valve. The lip 43a serves as the valve seat of a discharge valve of the pump. The movable valve member of this discharge valve is a perforated disc 44a which is identical to the previously described valve disc 44 in the inlet valve. The valve disc 44a cooperates with its valve seat 43a in the manner already described for the inlet valve 43,44. The top wall 49 of the plunger 17 is spaced above the valve disc 44a when the latter is seated on its valve seat 43a.

Above the valve disc 44a and to one side the top wall 49 of the plunger 17 is formed with an opening 60 from which a discharge passageway 61 extends laterally over to the recess 20 in which the rounded upper end 19 of the discharge spout 18 is swiveled.

When the lower end of the discharge spout 18 is engaged between the retainer fingers 21 (FIG. 2) the rounded enlargement 19 on the upper end blocks the discharge passageway 61. When the discharge spout is raised to the phantom-line position in FIG. 2 (the full-line position in FIG. 4), the spout passageway communicates with the discharge passageway 61. Thus, the rounded upper end 19 of the spout acts 18 as a valve controlling the connection of the spout passageway to the discharge passageway 61.

OPERATION

In the operation of this embodiment of the present pump, an upstroke of the plunger enlarges the volume of the pressurizing compartment 62 and tends to create a partial vacuum there. Consequently, the fluid pressure unbalance above and below the inlet valve disc 44 raises it off the valve seat 43 and permits the fluid product stored in the container 16 to flow up through the dip 37 and the central passageway 42 in the fixed pump body 15, and through the openings 45 in the valve disc 44 into the pressurizing compartment 62. The initial flow of fluid product through the valve disc 44 further unbalances the valve disc because each opening 45 in the valve disc acts as a venturi-like flow-restricting passage which produces an additional pressure unbalance across it due to the flow of fluid product through it. Consequently, a rapid movement of the inlet valve disc 44 to a fully unseated position is assured. The outer rim of the valve disc acts as a centering positioner.

The discharge valve 44a, 43a stays closed during the upstroke.

The withdrawal of fluid product from the container 16 into the pressurizing compartment 62 of the pump tends to create a partial vacuum inside the top of the container 16 above the fluid level, but atmospheric air immediately leaks into this space via the leakage path provided by the clearance between the screw threads 28 and 29, the grooves 41 in the top of the vent ring, and the unseating of the readily flexible inner lip 39 of this ring from its previous sealing engagement with the downwardly-facing annular shoulder 38 on the inner wall 35 of the fixed body 15 of the pump.

When the displaceable body 17,52 of the pump is pushed down from its fully-raised position in FIG. 2 it acts as a piston, reducing the volume of the pressurizing compartment 62 and increasing the fluid pressure in this compartment. Consequently, the inlet valve disc 44 is forced down to a closed position seated on the valve seat 43. Also, the valve disc 44a of the discharge valve is raised off its valve seat 43a, passing fluid product to the discharge passageway 61 and from there to the discharge spout 18. The same quick and full opening takes place at the discharge valve 44a, 43a due to the flow-restricting action of the openings 45a in valve disc 44a. Also, the same action closes the inlet valve disc quickly and completely.

The inner body member 52 of the plunger 17 and the fixed body 15 of the pump define between them a pressurizing compartment 62 whose volume varies with the position of the plunger along the fixed body 15. The volume of this pressurizing compartment is at maximum when the plunger is at its uppermost position along the fixed body 15 of the pump, as shown in FIG. 2. At this time, the volume of this chamber includes the space inside the inner wall 56 of the inner body member 52 of the plunger between the inlet valve 44, 43 and the discharge valve 44a, 43a, the annular space around the upper intermediate side wall 31 of the fixed body 15 along the entire length of that wall, and the annular space between the lower intermediate side wall 27 and the outer side wall of the fixed body 15.

FIG. 4 shows how the volume of this pressurizing chamber is reduced as the plunger is pushed down along the fixed body 15. The inside diameter of the inner side wall 56 of the plunger is substantially larger than the outside diameter of both the upper intermediate side wall 31 and the lower intermediate side wall 27 of the fixed body 15. Consequently, as the plunger is pushed down, the fluid product in the annular lower end of the fixed body 15 flows up along the outside of the walls 27 and 31 and into the space between the inlet and discharge valves 44, 43 and 43a and 44a.

When the downward manual force on the plunger is released, the plunger is pulled back up to the raised position shown in FIG. 4. The fluid pressure in the pressurizing compartment 62 drops below atmospheric, causing the exhaust 44a, 43a to begin to close. When this pressure drop occurs in compartment 62, fluid product in the discharge passageway 61 and the discharge spout is drawn back into the compartment 62, flowing through the openings 45a in the exhaust valve disc 44a until the latter is fully seated on its valve seat 43a.

As already described, in the upstroke of the plunger, the inlet valve 44, 43 will open, drawing product from the container 16 up into the pressurizing compartment 62 of the pump. At this time ambient air leaks into the top of the container past the screw threads 28, 29 and the air vent ring 39–41.

The entire pump including the valve members may be made out of plastic. The valve members are lightweight plastic so they move quickly.

FIGS. 8 and 9—MODIFIED VALVE DISCS

The apertured valve disc of either or both the inlet valve and the exhaust valve in the pump of FIGS. 1–7, may be replaced by a valve disc as shown in FIG. 8 or FIG. 9.

In FIG. 8 the valve disc has an imperforate central segment 70 of circular outline and four radially outwardly projecting fingers 71 which are equidistant circumferentially from each other. These fingers define between them four accurate slots or recesses 72 which are open at the periphery of the valve disc for passing fluid product after the valve disc is initially unseated from its valve seat. The imperforate central segment 70 of the valve disc is wider than the valve seat, so that the slots or recesses 72 will be blocked from the fluid product at the inlet side of the valve seat when the valve disc is seated on the valve seat.

In FIG. 9 the valve disc has a similar imperforate central segment 80 of circular outline for sealing engagement with the valve seat. Eight radial fingers 81 project laterally outward from this central segment and define between them slots or recesses 82 which are open at the periphery of the valve disc. The imperforate central segment 80 of this valve disc is wider than the valve seat so as to completely block the inlet passage through the valve seat when the valve disc is seated. The recesses 82 constitute flow restricting passages and the fingers 81 are centering portions.

FIGS. 10–12

In the embodiment of FIGS. 10–12, the inlet valve of the pump has a flexible valve seat defined by an upwardly projecting flexible annular lip 90 formed integral with the top wall 34 of the fixed body 15 of the pump. A depending annular lip 91 on this top wall defines the lower end of a passageway 92, leading up to the valve seat at 90.

The movable valve member in this inlet valve is a valve disc 93 (FIG. 12) having a cylindrical outer wall 94 and a flat connecting web 95 extending transversely inside the outer wall and formed with a plurality of circular openings 96. A frusto-conical nose 97 extends down from the middle of this connecting web and sealingly engages the upwardly-facing flexible valve seat 90. This nose has a central recess 98. The valve disc has a similar upwardly-projecting nose 99 directly above the bottom nose. The outer wall 94 of the valve disc has a sliding fit inside a reduced cylindrical extension 100 which extends up from the top wall of the fixed body 15. The annular retainer lip 32 is on the upper end of this extension 100 to limit the upward movement of the valve disc 93.

The exhaust valve is essentially similar. Elements of the exhaust valve which correspond to the elements of the inlet valve are given the same reference numerals, but with an "a" suffix added, so that the detailed description need not be repeated.

FIGS. 13–18 show a further embodiment of this invention having a different air vent arrangement for letting air into the top of the container, a different arrangement for locking the pump in an inoperative position, and various other structural changes from the embodiments already described. Elements of the embodiment of FIGS. 13–18 which correspond to those in the first-described embodiment are given the same reference numerals as in FIGS. 1–6, and the detailed description of these elements will not be repeated.

Referring to FIG. 14, the fixed body 15' of the pump has a cylindrical outer wall 110, a flat annular bottom wall 111 extending radially inward from the lower end of the outer wall 110, a cylindrical intermediate wall 112 extending up from the inner edge of the bottom wall 111, a flat annular top wall 113 extending radially inward from the upper end of the intermediate wall 112, and a cylindrical inner wall 114 extending down from the top wall 113. The intermediate wall 112 and the inner wall 114 are concentric with the outer wall 110.

At its upper end the intermediate wall 112 is formed with internal screw threads 115 for engagement with the external screw threads 29' on the neck 26 of a relatively wide-mouthed container 16, as shown in FIG. 14. The inner wall 114 is formed with internal screw threads 116 for engagement with the external screw threads on a container (not shown) which has a substantially narrower neck than the container shown in FIG. 14. Thus, the fixed body 15' of the pump may be mounted on containers having either of two mouth sizes.

At its inner edge the top wall 113 of the fixed body 15' presents an upwardly-facing, conical valve seat 113a (FIG. 18), which is located above, and radially inward past, the screw threads 116 on the depending inner wall.

In accordance with this embodiment of the invention, a separately formed vent member 120 cooperates with the fixed body 15' to control the admission of ambient air into the top of the container 16. This vent member has a generally flat, annular top wall 121 which directly overlies the top wall 113 of the fixed body 15'. At its inner periphery the top wall 121 presents a thin, flat, annular lip 43' which provides a valve seat for the apertured inlet valve disc 44.

The vent member 120 has a cylindrical inner side wall 122 which extends down from its top wall 121 at the outside of the valve seat 43'. This inner side wall is snugly received in the upper end of the dip tube 37, which extends down into the container 16 for passing fluid product from the container.

The vent member 120 has an annular wall 123 which projects up from its top wall 121 and terminates at its upper end in a radially inturned annular lip 32 encircling an opening 33. This lip 32 limits the upward movement of the inlet valve disc 44 away from the inlet valve seat 43'.

Figure 18:
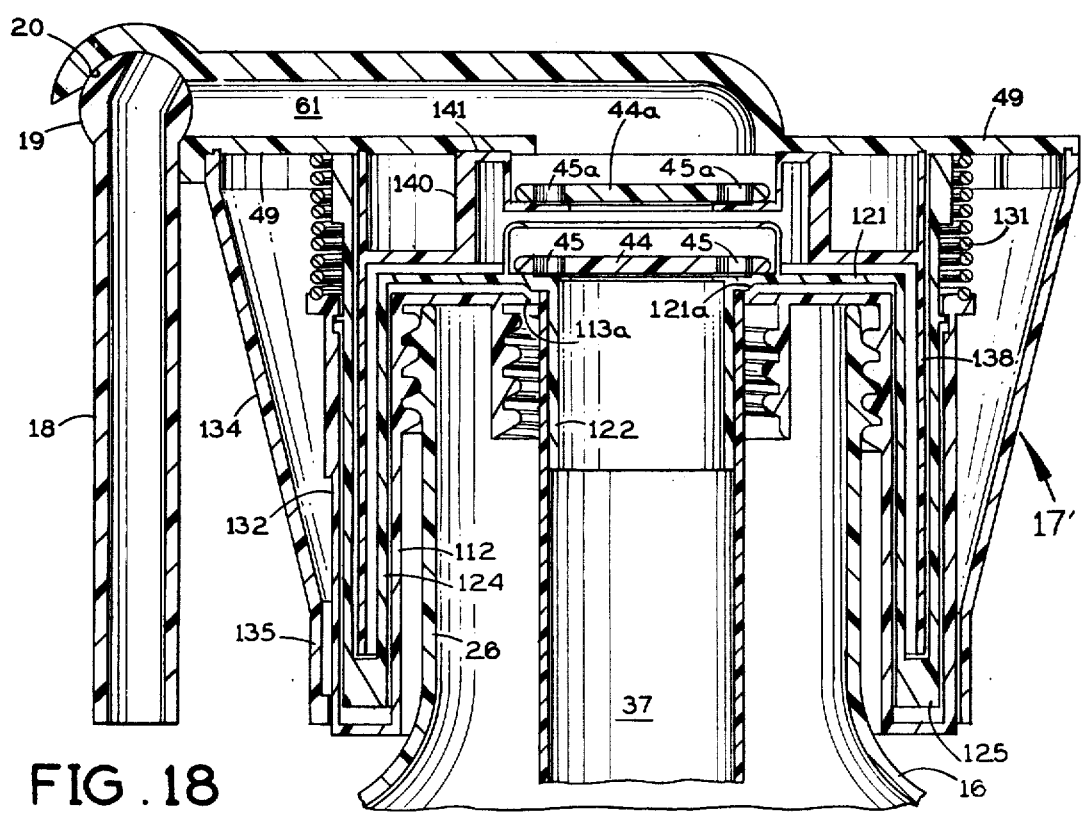
FIG. 18 is a view similar to FIG. 17, showing the plunger just after its upward movement has begun.

At the juncture between the upper end of its inner wall 122 and its top wall 121, the vent member 120 presents a thickened annular segment with a downwardly facing conical outer edge 121a located just outside the upper end of the dip tube 37. This conical edge 121a on the vent member sealingly engages the upwardly facing conical edge 113a on the fixed body 15' when the top wall 121 of the vent member rests directly on the top wall 113 of the fixed body, as shown in FIG. 14. However, as shown in FIG. 18, when the vent member 120 moves up along the fixed body 15', the conical edge 121a on the vent member unseats from the conical edge 113a on the fixed body for venting the upper end of the container 16 to the atmosphere, as described in greater detail hereinafter.

The top wall 121 of the vent member 120 is joined at its outer periphery to a downwardly extending, cylindrical, intermediate wall 124, which extends down around the outside of the intermediate wall 122 of the fixed body 15' with a slight clearance between them to permit the flow of air. At its lower end the the intermediate wall 124 of the vent member 120 is joined to a radially outwardly extending, annular bottom wall 125, located above the bottom wall 116 of the fixed body 15'. The outer end of this bottom wall 125 is joined to the lower end of an upwardly extending, cylindrical outer wall 126, which extends up inside the outer wall 110 of the fixed body 15' with a slight clearance between them to permit the flow of air.

The outer wall 126 of the vent member 120 carries a plurality of radially outwardly projecting tabs 127 which are spaced apart circumferentially, as shown in FIG. 15. These tabs are received in a cylindrical groove 128 on the inside of the outer wall 110 of the fixed body 15', as shown in FIG. 14. The vertical height of this groove determines how far the vent member 120 can move up along the fixed body 15'.

When the tabs 127 on the vent member 120 engage the upwardly-facing, flat, annular bottom wall of the groove 128 in the fixed body 15', as shown in FIG. 14, the top wall 121 of the vent member 120 rests directly on, and sealingly engages, the top wall 113 of the fixed body 15' and the downwardly facing conical edge 121a on the vent member sealingly engages the complementary valve seat 113a on the fixed body. Ambient air cannot pass between the top walls of the fixed body 15' and the vent member 120 in this position of the parts.

When the plunger 17' is pushed down along the fixed body 15' the vent member 120 moves up along the fixed body 15' until its tabs 127 engage the downwardly-facing, annular, flat top wall of the groove 128 in the fixed body, as shown in FIG. 18. In this position of the parts the top wall 121 of the vent member is unseated from the top wall 113 of the fixed body and the conical edge 121a on the vent member is unseated from the valve seat 113a on the fixed body, thereby permitting the upper end of the interior of the container 16 to be vented to the atmosphere via the annular space between the intermediate walls 112 and 124 of the fixed body and the vent member, respectively, the annular space between their respective bottom walls 111 and 125, and the annular space between their outer walls 110 and 126.

The outer wall 110 of the fixed body 15' has a radially outwardly projecting annular flange or lip 129 at its upper end which presents a shallow, upwardly facing, annular groove 130 for seating the lower end of a coil spring 131. The upper end of this spring engages beneath the top wall 49 of the plunger 17'. This spring biases the plunger 17' upward along the fixed body 15'.

At the side where the discharge spout 18 is located, the outer wall 110 of the fixed body 15' is formed with a shallow recess or depression 132 on the outside which, as shown in FIG. 14, terminates at its upper end in a downwardly-facing horizontal shoulder 133 presented by this outer wall. The plunger 17' includes a generally conical outer piece 134 extending down from its top wall 49 and having a short cylindrical segment 135 at its lower end which presents a radially inwardly projecting lip 136 at the bottom. This lip is slidably received in the recess 132 on the outside of the fixed body 15' and it is engageable with the downwardly-facing shoulder 133 on the latter to limit the upward movement of the plunger 17' along the fixed body 15', as shown in FIG. 14.

As shown in FIG. 13, the recess 132 in the outside of the fixed body 15' is generally L-shaped, viewed in elevation. At the bottom it presents a vertically short extension 132a extending circumferentially to the left in FIG. 13. The outer wall 110 of the fixed body presents a downwardly-facing horizontal, circumferentially extending shoulder 137 as the top of this recess extension 132a. When the plunger 17' is pushed down and then turned to the left in FIG. 13, its inwardly projecting lip 136 will engage beneath the shoulder 137 on the fixed body 15'. This locks the plunger to the fixed body, as shown in FIG. 17, when the pump is not in use.

The vent member 120 presents a radially thicker segment 126a at the upper end of its outer wall 126 which engages the underside of the top wall 49 of the plunger 17' when the latter is in its locked position (FIG. 17).

The plunger 17' (excluding the discharge spout 18) is of three-piece construction, two of which are the top wall 49 and the generally conical outer piece 134. The third piece of the plunger is an inner piece having a cylindrical outer wall 138 which extends down from the top wall 49 and has a sliding fit inside the outer wall 126 of the vent member 120. At its upper end the outer wall 138 of this piece of plunger 17' is received in a complementary groove 149 formed in the bottom of the plunger's top wall 49. The outer wall 138 has a substantially greater spacing radially outward from the intermediate wall 124 of the vent member 120 than its spacing radially inward from the latter's outer wall 126. Thus, the annular space between the walls 138 and 124 is a downward extension of the pressurizing compartment 62 located immediately above the top wall 121 of the vent member 120. This downward extension of the pressurizing compartment extends around the neck of the container 16 and below the inlet valve 43', 44 of the pump.

The outer wall 138 of the inner piece of the plunger 17' near its upper end is joined to a horizontal, flat, annular, radially inwardly projecting wall 139. A cylindrical intermediate wall 140 extends up from the inner edge of wall 139. A flat, annular, horizontal top wall 141 extends radially inward from the upper end of the intermediate wall 140. This top wall is snugly seated in a complementary downwardly-facing groove 142 formed in the bottom face of the top wall 49 of plunger 17'. A cylindrical inner wall 143 extends down from the inner edge of the top wall 141. A flat, annular bottom wall 144 extends horizontally radially inward from the lower end of the inner wall 143, and the flat top face of this wall provides an upwardly-facing valve seat for the apertured discharge valve disc 44a. The bottom wall 144 surrounds an opening 59 through which product may flow up from the pressurizing compartment 62 into the discharge passageway 61 when the valve disc 44a is unseated.

OPERATION

The pump and container are shipped with the pump in its locked position, as shown in FIG. 17, in which the plunger 17' is at its lowermost position along the fixed body 15' of the pump.

FIG. 18 shows the position of the parts after the plunger 17' has been turned on the fixed body 15' from left to right in FIG. 13, enough to disengage the plunger lip 136 from the body shoulder 137. The force of the spring 131 begins to move the plunger 17' up along the fixed body 15'. The upward movement of the plunger initially creates a partial vacuum in the pressurizing compartment 62 above the top wall 121 of the vent member 120, and this partial vacuum causes the vent member to move up with the plunger, as shown in FIG. 18, until its tabs 127 engage the top of the groove 128 in the fixed body 15'. This initial upward movement of the vent member 120 unseats its conical surface 121a from the valve seat 113a, and ambient air can enter the top of the container 16 (above the product level) through the clearance between the outer piece 134 of the plunger and the outer wall 110 of the fixed body 15', the clearance between wall 110 and the outer wall 126 of the fixed body, the clearance between the bottom wall 111 of the fixed body and the bottom wall 125 of the vent member, the clearance between the intermediate walls 124 and 112 of the vent member and the fixed body, respectively, the space between their respective top walls 121 and 113, and the clearance between the conical surface 121a on the vent member and its valve seat 113a. (If the fixed body 15' of the pump is screwed onto a narrow-mouthed container, the clearance between the external threads on the mouth of that container and the threads 116 on the inner wall 114 of the pump body 15' will complete the path for ambient air into the top of the container.)

It will be evident that the vent member 120 coacts with the fixed body 15' to provide a valving action for supplying ambient air pressure into the container 16 above the fluid product level therein when the plunger 17' first begins its upstroke.

As upward movement of the plunger 17' continues beyond the early position shown in FIG. 18, the vent member 120 remains in the same position with respect to the fixed body 15' of the pump. As the pressurizing chamber 62 above the top wall 121 of the vent member expands, a partial vacuum is established there which opens the inlet valve 44,43' and draws fluid product from the container 16 up through the dip tube 37 and into the compartment 62. The inlet valve 44,43' functions in the manner already described in detail with reference to FIGS. 1-6. An advantage of this invention is that the vent valve provided by the vent member 120 and the fixed body 15' opens slightly before the inlet valve 44,43' opens, and the establishment of atmospheric pressure inside the container facilitates the withdrawal of fluid product from the container into the pressurizing compartment 62 of the present pump. This action continues until the lip 136 on the bottom of the plunger engages the shoulder 133 on the fixed body 15' to stop the upstroke of the plunger. The discharge valve 44a, 144 remains closed throughout the upstroke of the plunger.

Thereafter, after the discharge spout 18 has been pivoted in the direction of the arrow in FIG. 18 to put its passageway in fluid communication with the discharge passageway 61 in the top of the plunger 17', when the plunger 17' is pushed down the resulting pressure on the fluid product in the pressurizing compartment 62 causes it to close the inlet valve 44,43' and open the discharge valve 44a, 144 to pass product to the discharge spout 18.

A principal advantage of the present pump, in each of the embodiments disclosed, is that it is capable of quickly pumping a relatively large volume (e.g. 2 ounces) of fluid product out of the container 16 into the pressurizing compartment 62 and from there to the discharge spout 18 in a single up-and-down reciprocation of the plunger 17 or 17'. When the plunger is up, the volume of the pressurizing compartment includes a relatively large annular space extending down around the neck 26 of the container as well as the space between the inlet and discharge valves.

The apertured construction of the valve discs in the inlet and discharge valves insures a quick and complete opening of each valve at the appropriate time during each cycle of operation of the pump.

When the exhaust valve begins to close it withdraws fluid product from the discharge passageway 61 and the spout 18 back into the pressurizing compartment 62 of the pump, so that the product does not continue to flow out of the discharge spout after a pumping operation is completed.

The swiveled upper end of the discharge spout 18 acts as a valve to prevent the flow of product except when the spout has been raised to an operative position.

While certain presently-preferred constructions of the present pump have been disclosed in detail, with different versions of the inlet and discharge valves, it is to be understood that structural changes and omissions may be adopted.

We claim:

1. In a pump for expelling fluid product from a container having a reduced neck leading to an opening at its upper end, said pump comprising:
   means defining a variable volume pressurizing chamber with an inlet for receiving the fluid product from the container and an outlet for discharging the fluid product from the pressurizing chamber, said means including a fixed body having means for attaching it to said neck of the container and a manually displaceable plunger slidable downward along said fixed body to decrease the volume of said chamber and increase the fluid pressure therein and slidable upward to increase the volume of said chamber and reduce the fluid pressure therein;
   means defining an upwardly-facing annular recess located radially outward from said means for attaching, so as to extend around the reduced neck on the container when said fixed body is attached thereto, said annular recess communicating at its upper end with said pressurizing chamber for the flow of fluid product between them;
   said plunger having a depending annular portion thereof slidably received in said annular recess to pump fluid product out of said recess when the plunger is moved down along said fixed body;
   an inlet valve at said inlet comprising a valve seat and a movable valve member which is sealingly engageable with said valve seat, said inlet valve being operable to open in response to a pressure decrease in said pressurizing chamber when the plunger moves up and to close in response to a pressure increase in said chamber when the plunger moves down;
   and a discharge valve at said outlet comprising a valve seat and a movable valve member which is sealingly engageable therewith, said discharge valve being operable to open in response to a pressure increase in said pressurizing chamber when the plunger moves down and to close in response to a pressure decrease in said chamber when the plunger moves up;

2. A pump according to claim 1, and further comprising:
   means on said plunger defining a discharge passageway extending laterally from said discharge valve to one side of the plunger, said discharge passageway terminating in a rounded recess at said side of the plunger;
   and a discharge spout having a longitudinal passageway therethrough, said spout having a rounded enlargement on its upper end slidably received in said recess and providing a valve for closing said discharge passageway when the spout is lowered and for opening said discharge passageway when the spout is raised.

3. A pump according to claim 1, wherein:
   said fixed body has an annular inner side wall spaced radially inward from said annular recess and of substantially smaller diameter than the container neck so as to extend down with a substantial clearance inside the container neck for attachment to a dip tube, said inner side wall defining an annular downwardly-facing external shoulder;
   and a vent ring having an annular mounting portion which directly overlies the top of the container neck when said fixed body of the pump is attached thereto, said vent ring having a flexible and resilient annular lip at the inside of said mounting portion which is sealingly engageable with said shoulder from below, said lip being operative to flex down away from said shoulder for passing ambient air into the top of the container in response to the pressure differential caused by the withdrawal of fluid product from the container.

4. A pump according to claim 3, wherein said mounting portion of the vent ring has lateral grooves in the top for passing ambient air to the space above said lip.

5. A pump according to claim 1, wherein said movable valve member in at least one of said valves has an imperforate central portion which sealingly engages the corresponding valve seat and closes the respective opening and one or more flow-restricting passages outside said central portion for accelerating and completing the opening and closing of said valve by the pressure unbalance on said last-mentioned movable valve member developed by the initial flow of fluid through said one or more passages when said last-mentioned movable valve member is first unseated from the corresponding valve seat.

6. A pump according to claim 5, wherein the movable valve member in said inlet valve has said central portion and said one or more flow-restricting passages therein.

7. A pump according to claim 5, wherein the movable valve member in said discharge valve has said central portion and said one or more flow-restricting passages therein.

8. A pump according to claim 5, wherein the respective movable valve members in both said inlet and discharge valves have said central portion and said one or more flow-restricting passages therein.

9. A pump according to claim 8, wherein:

said valve seat of each of said valves is annular;

said imperforate central portion of the movable valve member of each of said valves completely blocks the flow passage through the respective annular valve seat when seated thereon;

and said movable valve member of each of said valves provides said one or more flow-restricting passages laterally beyond the respective annular valve seat, so that said one or more flow-restricting passages are blocked from fluid communication with the flow passage through the respective annular valve seat while said movable valve member is seated thereon.

10. A pump according to claim 9, and further comprising:

means on said plunger defining a discharge passageway extending laterally from said discharge value to one side of the plunger, said discharge passageway terminating in a recess at said side of the plunger;

and a discharge spout having a longitudinal passageway therethrough, said spout having an enlargement on its upper end slidably received in said recess and providing a valve for closing said discharge passageway when the spout is lowered and for opening said discharge passageway when the spout is raised.

* * * * *